Patented Aug. 18, 1925.

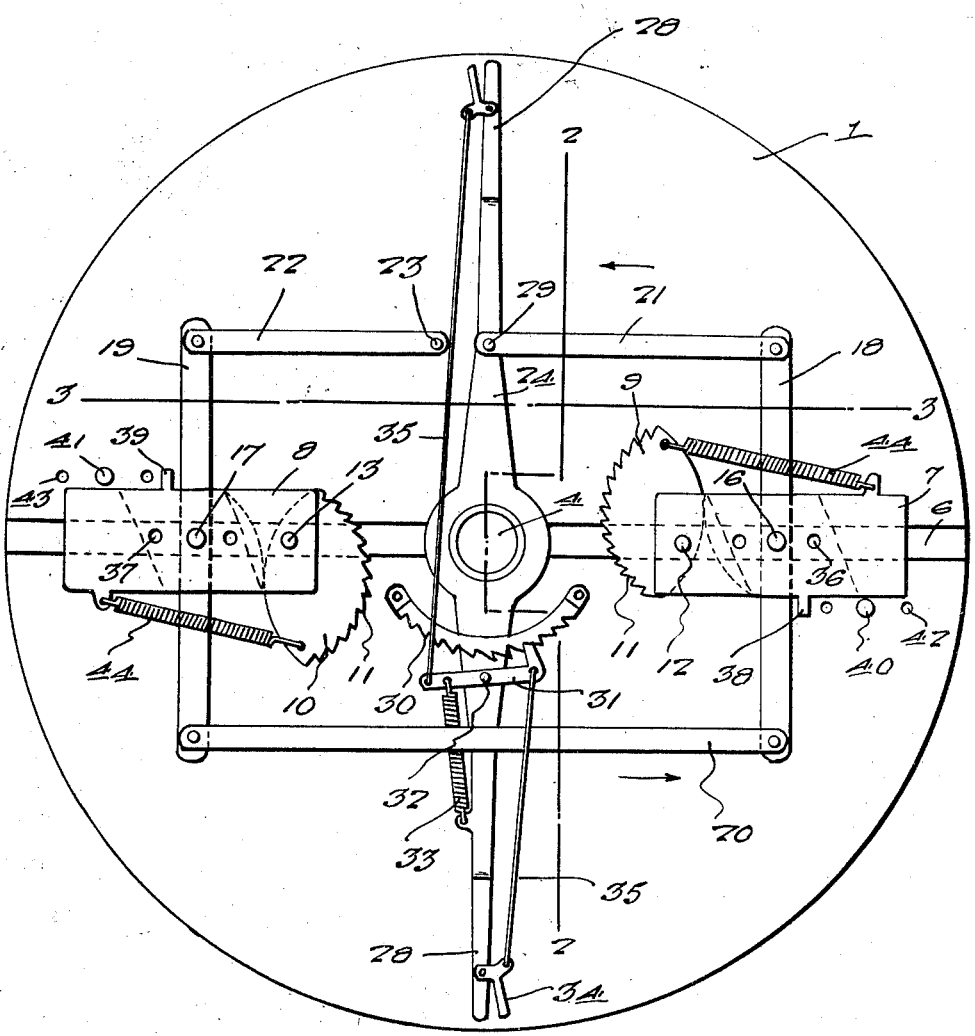

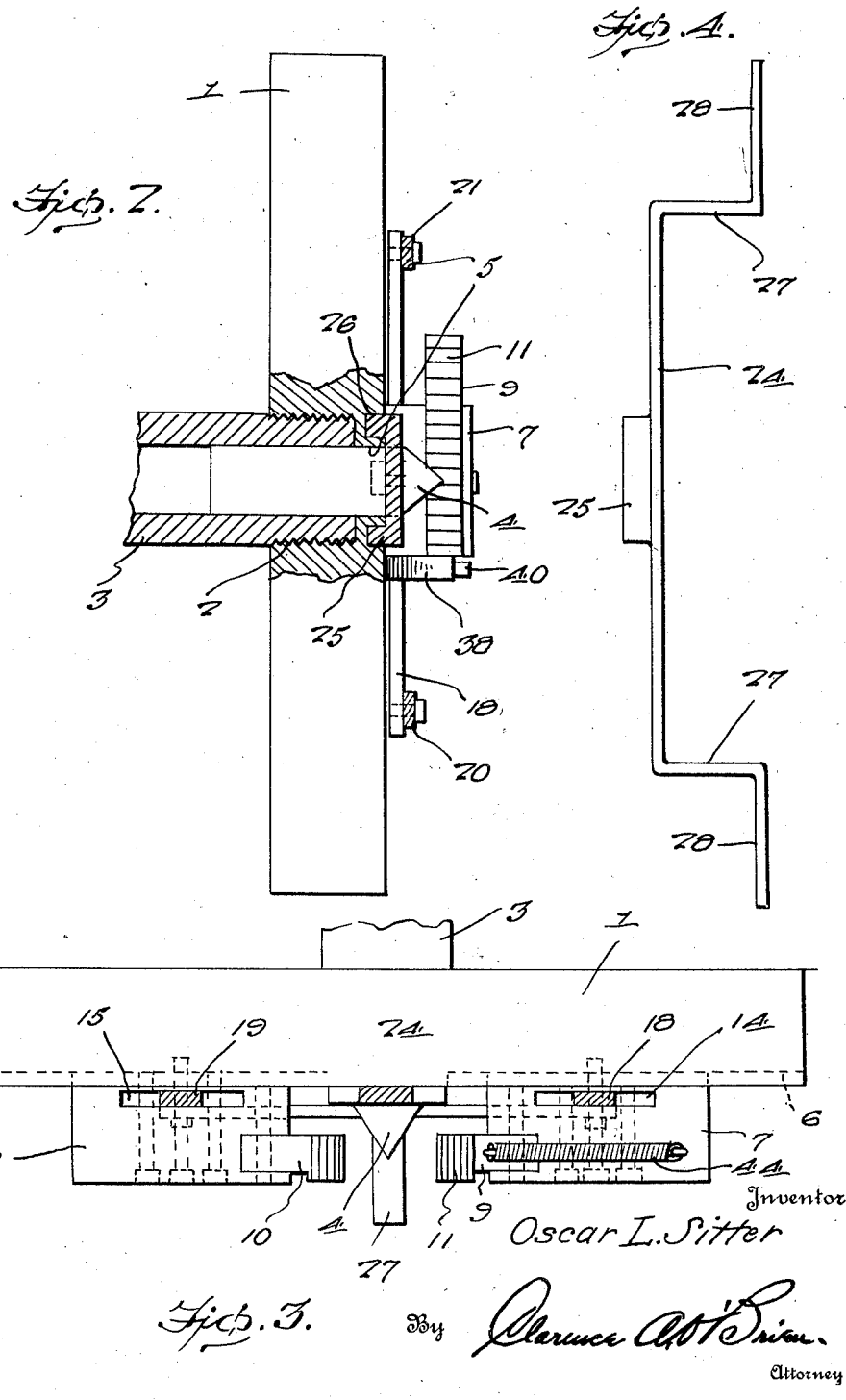

1,549,928

UNITED STATES PATENT OFFICE.

OSCAR L. SITTER, OF SEDALIA, MISSOURI.

FACEPLATE AND AUTOMATIC DOG FOR LATHES.

Application filed May 21, 1924. Serial No. 714,991.

*To all whom it may concern:*

Be it known that I, OSCAR L. SITTER, a citizen of the United States, residing at Sedalia, in the county of Pettis and State of Missouri, have invented certain new and useful Improvements in a Faceplate and Automatic Dog for Lathes, of which the following is a specification.

This invention relates to new and useful improvements in face plates and dogs for use in connection with turning lathes and has for its principal object to provide a face plate and dog construction which will efficiently and positively hold the stock in proper position on the head stock spindle point.

A further object of the invention is to provide an automatic dog construction which is of such construction as to enable the gripping dogs to be simultaneously actuated whereby the same may be brought into or out of engagement with the object supported on the lathe, means being further provided for holding the gripping jaws in their proper adjusted positions.

A still further object of the invention is to provide a face plate and dog construction of the above mentioned character, wherein gripping dogs are slidably associated with the face plate, means being mounted on the face plate and connected to the gripping dogs for actuating the latter for moving the same into or out of engagement with the stocks or objects to be turned.

A further object is to provide a face plate and dog construction of the above mentioned character, which is simple in construction, inexpensive, strong and durable and furthermore adapted for the purposes for which it is designed.

Other objects and advantages of this invention will become apparent during the course of the following description.

In the accompanying drawing forming part of this specification and in which like numerals designate like parts throughout the same:

Figure 1 is a front elevation of my improved face plate and dog construction.

Figure 2 is a sectional view taken approximately on line 2—2 of Figure 1.

Figure 3 is a sectional view taken approximately on line 3—3 of Figure 1, and

Figure 4 is a detail side elevation of the actuating lever.

In the drawings wherein for the purpose of illustration is shown the preferred embodiment of my invention, the numeral 1 designates the face plate which is provided with the threaded central opening 2 whereby the same may be supported on the threaded end of the lathe spindle 3. The head stock center 4 is extended outwardly from the threaded end of the lathe spindle and through the reduced opening 5 provided in the outer face of the face plate 1 in the manner clearly illustrated in Figure 2 of the drawing. Provided in the outer face of the face plate 1 is the diametrically extending slot 6 and the purpose thereof will hereinafter be more fully described.

Slidably mounted in the diametrically extending guide slot 6 provided in the outer face of the face plate 1 and arranged on opposite sides of the center point 4 are the blocks 7 and 8 respectively. In order that the blocks may be supported on the face plate against displacement therefrom, the blocks may be provided with dove-tailed ribs on the back faces thereof for engagement with the dove-tailed guide slots 6 although any suitable arrangement may be provided for carrying out the purposes above set forth. Pivotally supported on the inner ends of the blocks 7 and 8 are the gripping jaws 9 and 10 respectively, the outer edges of which are serrated as shown at 11. The gripping jaws are preferably in the form of cams and are adapted to engage the piece of stock which is placed on the lathe between the tail stock and the head stock in the manner hereinafter to be more fully described. The pivotal connection for the gripping jaws are shown at 12 and 13 respectively in the drawings.

Each of the blocks are provided with a centrally arranged slot which extends from the upper to the lower edge of the blocks as shown at 14 and 15 respectively in the drawings. The slots are preferably arranged at an angle with respect to the axis of each block and the purpose thereof will also be hereinafter more fully described. Extending transversely through the center of the blocks 7 and 8 are the pins 16 and 17 respectively, and the same provide a means for pivotally supporting the intermediate portion of the vertically disposed levers 18 and 19 respectively.

These levers extend through the slots provided in the blocks and furthermore provide a means for moving the blocks and the gripping jaws carried by the interposed ends thereof inwardly or outwardly with respect to the center point 4 and the adjacent end of the article to be turned. The ends of the vertical levers 18 and 19 which extend outwardly from the blocks in one direction are connected together by means of the elongated horizontal link 20. The opposite ends of the vertical levers are fastened to the links 21 and 22 respectively in the manner clearly shown in Figure 1 of the drawings. The link 21 which is connected at one end with the lever 18 is adapted to be fastened to an actuating lever, the construction of which will be presently described. The other horizontal link 22 which is connected to the vertical lever 19 at one end has its opposite end anchored or fastened to the face plate 1 in the manner shown at 23 in the drawings.

The actuating lever which forms part of the present invention and provides a means for moving the blocks and the gripping jaws carried thereby into an operative or inoperative position comprises a central portion 24, the intermediate portion of which is provided with a hub 25. The hub 25 extends around the center point 4 of the head stock and is receivable in an annular recess 26 provided therefor in the outer face of the face plate 1 in the manner more clearly shown in Figure 2 of the drawings. The central portion 24 is thus disposed adjacent the outer face of the face plate and is preferably arranged at substantially right angles to the blocks and the guide slot 6 in which the same operate.

The central portion 24 of the lever terminates at its ends in the lateral offset 27 and the latter terminates in the outwardly extending portion 28 which provides handles for the lever whereby the same may be actuated. The handles terminate at points adjacent the outer edge of the face plate in the manner clearly shown in Figure 1. The link 21 which is connected at one end to the vertical lever 18 is fastened to the central portion 24 of the lever in the manner shown at 29 and is adapted to be actuated simultaneously with the operation of the lever in the manner to be presently described. Arranged on the face plate adjacent the center point is the toothed segment 30. The segment extends over the central portion of the lever and cooperating therewith is the locking pawl 31 which is pivoted intermediate its ends as shown at 32 on the central portion of the lever.

For the purpose of actuating the pawl 31 to disengage the same from the segment, it being understood that the coil spring 33 normally holds the pawl in engagement with the teeth of the segment, I provide the auxiliary handles 34 which are pivotally associated with the handle portions 28 of the lever and an actuating rod connects each of the auxiliary handles to the pawl 31 in the manner shown at 35 in the drawings with reference more particularly to Figure 1.

The blocks 7 and 8 are provided with a plurality of openings such as are shown at 36 and 37 respectively and these openings extend transversely through the slots 14 and 15 and provide a means for receiving pivot pins 16 and 17 whereby the same may be placed in either of the openings as is desired. For the purpose of limiting the outward movement of the blocks, I provide the same with projecting lugs 38 and 39 respectively and the same are adapted to engage with the stop pins 40 and 41 which are supported in one of the recesses 42 and 43 provided in the face plate adjacent the outer end of the block in the manner clearly illustrated in Figure 1.

Normally the parts are arranged in the manner shown in Figure 1 of the drawing. When it is desired to secure one end of the stock to be turned in the lathe on the center point of the head stock, the operator grasps the face plate in one hand and the handle 28 of the lever in the other hand. The lever is then pulled in the direction of the arrow shown in Figure 1 of the drawings and the movement of the lever in this direction will cause the vertical lever 18 to swing on its pivot 16 in the part 7 until the same abuts the edge of the slot 14 whereby it will cause the block to move inwardly simultaneously with the inward movement of the block 7, the horizontal link 20 will move in the direction shown in the arrow causing the vertical lever 19 to swing on its pivot 17 until the same abuts the edge of the slot 15 provided in the block 8. A further movement of the links will cause the block 8 to move inwardly, it being understood that the link 22 is anchored at 23 to the face plate thereby preventing the block from moving in an outward manner.

The blocks moving inwardly toward each other will cause the serrated faces of the gripping jaws 9 and 10 respectively to engage the stock supported on the lathe whereby the same will be gripped and held in a firm and positive locked position and the pawl 31 will hold the lever in its adjusted position. When power is applied to the face plate, and the cutting tool is brought in contact with the stock supported on the lathe, the resistance will cause the stock to refuse to rotate for a fraction of a revolution, thereby causing the gripping jaws to tighter grip the stock whereby the resistance caused by the cutting tool will be overcome.

For the purpose of normally holding the gripping jaws in an open position, I provide the coil springs such as are shown at 44.

It will thus be seen from the foregoing description, that a face plate and lathe dog has been provided which will save considerable time in adjusting the dog in position on the stock to be turned by the lathe and furthermore the gripping jaws may be readily moved into an operative or inoperative position as is desired in a simple and efficient manner.

The simplicity of my device enables the same to be manufactured at a very low cost and will further be strong and durable.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. In combination, a face plate for lathes, a dog associated therewith comprising a pair of blocks slidably mounted on said face plate, gripping jaws carried by the inner opposed ends of said blocks, levers pivotally mounted on said blocks, and extending vertically therethrough, a link connecting the ends of said levers on one side of said blocks, the lever of one of said blocks having its opposite end fastened to the face plate, and an adjustable lever on said face plate and connected to the opposite end of the other vertical lever pivoted in the other block for actuating said blocks to move the same into an operative or inoperative position.

2. In combination, a face plate for lathes, a dog associated therewith comprising a pair of blocks slidably mounted on said face plate, gripping jaws carried by the inner opposed ends of said blocks, levers pivotally mounted on said blocks and extending vertically therethrough, a link connecting the ends of said levers on one side of said blocks, the vertical lever of one of said blocks having its opposite end fastened to the face plate, an adjusting lever on said face plate and connected to the opposite end of the other vertical lever for actuating said blocks to move the same into an operative or inoperative position, and means for holding the adjusting lever in different adjusted positions.

3. In combination, a face plate for lathes, a dog associated therewith comprising a pair of blocks slidably mounted on said face plate, gripping jaws carried by the inner opposed ends of said blocks, levers pivotally mounted on said blocks and extending vertically therethrough, a link connecting the ends of said levers on one side of said blocks, the vertical lever of one of said blocks having its opposite end fastened to the face plate, an adjusting lever on said face plate and connected to the opposite end of the other vertical lever for actuating said blocks to move the same into an operative or inoperative position, and means for normally holding the gripping jaws in an open position.

4. In combination, a face plate for lathes, a dog associated therewith comprising a pair of blocks slidably mounted on said face plate, gripping jaws carried by the inner opposed ends of said blocks, levers pivotally mounted on said blocks and extending vertically therethrough, a link connecting the ends of said lever on one side of said blocks, the vertical lever of one of said blocks having its opposite end fastened to the face plate, an adjusting lever on said face plate and connected to the opposite end of the other vertical lever for actuating said blocks to move the same into an operative or inoperative position, means for normally holding the gripping jaws in an open position, and means for holding the adjusting lever in different adjusted positions.

In testimony whereof I affix my signature.

OSCAR L. SITTER.